(12) United States Patent
Nagaoka et al.

(10) Patent No.: US 8,178,003 B2
(45) Date of Patent: May 15, 2012

(54) HYDROCARBON-REFORMING CATALYST AND PROCESS FOR PRODUCING SYNTHESIS GAS USING THE SAME

(75) Inventors: Katutoshi Nagaoka, Oita (JP); Yuusaku Takita, Oita (JP); Toshiya Wakatsuki, Chiba (JP)

(73) Assignee: Japan Petroleum Exploration Co., Ltd., Tokyo (JP)

( * ) Notice: Subject to any disclaimer, the term of this patent is extended or adjusted under 35 U.S.C. 154(b) by 0 days.

(21) Appl. No.: 12/734,053

(22) PCT Filed: Oct. 8, 2008

(86) PCT No.: PCT/JP2008/068310
§ 371 (c)(1),
(2), (4) Date: Apr. 6, 2010

(87) PCT Pub. No.: WO2009/048083
PCT Pub. Date: Apr. 16, 2009

(65) Prior Publication Data
US 2010/0207070 A1    Aug. 19, 2010

(30) Foreign Application Priority Data
Oct. 11, 2007   (JP) .................. 2007-265490

(51) Int. Cl.
*C01B 3/38* (2006.01)
*C07C 1/02* (2006.01)
*B01J 23/00* (2006.01)
*B01J 21/00* (2006.01)
*B01J 20/00* (2006.01)
*B01J 29/00* (2006.01)
*B01J 37/00* (2006.01)

(52) U.S. Cl. ........ 252/373; 502/257; 502/258; 502/259; 502/260; 502/306; 502/313; 502/314; 502/315; 502/316; 502/320; 502/323; 502/327; 502/328; 502/332; 502/335; 502/336; 502/337; 502/338; 502/341; 502/355

(58) Field of Classification Search .......... 502/257–260, 502/306, 313–316, 320, 323, 327, 328, 332, 502/335–338, 341, 355; 252/373
See application file for complete search history.

(56) References Cited

U.S. PATENT DOCUMENTS
3,421,871 A    1/1969    Davies
(Continued)

FOREIGN PATENT DOCUMENTS
JP    S42-7252    3/1967
(Continued)

OTHER PUBLICATIONS

Japanese Patent Office, International Search Report, Dec. 22, 2008, from International Patent Application No. PCT/JP2008/068310, filed on Oct. 8, 2008.
(Continued)

*Primary Examiner* — Cam N. Nguyen
(74) *Attorney, Agent, or Firm* — Kenyon & Kenyon LLP

(57) ABSTRACT

A hydrocarbon-reforming catalyst comprising a composite oxide having a composition represented by the following formula (I) in which Co, Ni and M are dispersed in the composite oxide and a process for producing a synthesis gas by using the catalyst are provided.

$$aM.bCo.cNi.dMg.eCa.fO \quad (I)$$

wherein a, b, c, d, e, and f are molar fractions, $a+b+c+d+e=1$, $0.0001 < a \leq 0.20$, $0 < b \leq 0.20$, $0 \leq c \leq 0.20$, $0.001 < (b+c) \leq 0.20$, $0.60 \leq (d+e) \leq 0.9989$, $0 < d < 0.9989$, $0 < e < 0.9989$, f=the number necessary for element to keep charge equilibrium with oxygen. And M is at least one element among Group 3B elements and Group 6A elements in the Periodic Table.

The reforming catalyst is able to maintain a high catalytic activity over a long period in reforming hydrocarbons.

6 Claims, 1 Drawing Sheet

U.S. PATENT DOCUMENTS

| | | | |
|---|---|---|---|
| 3,650,713 A * | 3/1972 | Chinchen et al. | 48/198.7 |
| 5,744,419 A * | 4/1998 | Choudhary et al. | 502/326 |
| 5,756,421 A * | 5/1998 | Choudhary et al. | 502/328 |
| 5,980,840 A | 11/1999 | Kleefisch et al. | |
| 6,423,665 B1 * | 7/2002 | Okado et al. | 502/328 |
| 7,157,401 B2 * | 1/2007 | Purta et al. | 502/180 |
| 7,432,222 B2 * | 10/2008 | Choudhary et al. | 502/304 |

FOREIGN PATENT DOCUMENTS

| | | |
|---|---|---|
| JP | 58-049602 | 3/1983 |
| JP | 2000-288394 | 10/2000 |
| JP | 2002-509483 | 3/2002 |
| JP | 2002-126528 | 5/2002 |
| JP | 2002-126529 | 5/2002 |
| JP | 2002-126530 | 5/2002 |
| JP | 2004-089812 | 3/2004 |
| JP | 2004-141860 | 5/2004 |
| JP | 2005-103468 | 4/2005 |
| JP | 2005-529744 | 10/2005 |
| WO | WO 2004/000456 | 12/2003 |

OTHER PUBLICATIONS

Yusaku Hashimoto et al., "GTL Process no Tameno Koatsu Methane Kaishitsu Hannoyo MgO Tanji Hikinzoku Shokubai no Kaishitsu", The Japan Petroleum Institute Nenkai Shuki Taikai Koen Yoshishu, Dai 36 Kai Sekiyu/Sekiyu Kagaku Toronkai, Dec. 1, 2006, p. 190.

Yusaku Hashimoto et al., "GTL Process no Tameno Koatsu Methane Kaishitsu Hannoyo MgO Tanji Hikinzoku Shokubai no Kaishitsu (2)", Dai 99 Kai Shokubai Toronkai Toronkai A Yokoshu, Mar. 28, 2007, p. 12.

Osamu Yamazaki et al, Reduction of Carbon Dioxide by Methane with Ni-on-MgO-CaO Containing Catalysts, Chemistry Letters, 1992, pp. 1953-1954.

Office Action issued on related Japanese Patent Application No. 2009-537015 with English translation thereof.

Edited by Catalysis Society of Japan, Catalyst Lectures vol. 5 (Engineering edition 4), catalyst design, Kodansha Ltd., Dec. 10, 1985, pp. 100-101, with partial English translation thereof.

Edited by The Chemical Society of Japan, Experimental Chemistry Lectures 17 Organic Compound Inventions I (second part), Maruzen Co., Ltd., 1963, Second Edition, p. 260, with partial English translation thereof.

Edited by Chemical Dictionary Editorial Committee, Chemical Dictionary 4, Kyoritsu Shuppan Co., Ltd., Oct. 15, 1963, Pocket Edition, p. 777, with partial English translation thereof.

* cited by examiner

HYDROCARBON-REFORMING CATALYST AND PROCESS FOR PRODUCING SYNTHESIS GAS USING THE SAME

CROSS-REFERENCE TO RELATED APPLICATIONS

This application is the National Stage of International Application No. PCT/JP2008/068310 filed on Oct. 8, 2008, which claims priority to Japanese Patent Application No. 2007-265490 filed on Oct. 11, 2007, each of which is expressly incorporated herein in its entirety by reference thereto.

TECHNICAL FIELD

The present invention relates to a reforming catalyst to obtain a synthesis gas, which is a mixture gas of carbon monoxide (CO) and hydrogen ($H_2$), from hydrocarbon such as methane and the like and a reforming agent such as water, carbon dioxide, oxygen, air and the like, and to a process for producing the synthesis gas by using the reforming catalyst.

This application claims priority on Japanese Patent Application No. 2007-265490 filed on 11 Oct. 2007, the disclosure of which is incorporated by reference herein.

BACKGROUND ART OF THE INVENTION

Hydrocarbon such as methane, natural gas, petroleum gas, naphtha, heavy oil, crude oil or the like is reacted with a reforming agent such as water, air, carbon dioxide or the like at a high temperature zone in the presence of a catalyst, thereby reformed to a highly reactive mixture gas of carbon monoxide and hydrogen. The reformed mixture gas of carbon monoxide and hydrogen is used as a raw material of methanol, liquid fuel oil, etc. Recently, research and development to separate hydrogen gas for fuel cells from the mixture gas have been also performed. Reforming catalysts such as nickel/alumina, nickel/magnesia/alumina and the like have been used in a reaction of synthesizing the mixture gas of carbon monoxide and hydrogen.

In a hydrocarbon/steam reacting system using a reforming catalyst, a reaction by-product, i.e. carbonaceous matters, is likely to be deposited on a surface of a catalyst. The deposited carbonaceous matters cover active sites of the catalyst surface so as to reduce catalytic activity. Heavy deposition of the carbonaceous matters causes the clogging, damage and the like of a catalyst and also deviation of gases flowing in a reaction zone, which results in decreasing a proportion of the catalyst effective for reforming reactions. Deposition of the carbonaceous matters on the surface of the catalyst can be avoided by introducing an excess amount of steam, but introduction of excess steam unavoidably requires increases in an energy cost and needs larger facilities.

A reforming catalyst where a catalytically active component is highly dispersed has been proposed in order to inhibit deposition of carbonaceous matters without the introduction of excess steam (Patent Document 1 & 2). Patent Document 1 describes a method below to obtain a reforming catalyst wherein a catalytically active component is highly dispersed. A method is employed in which the catalyst is manufactured by adding a co-precipitating agent to an aqueous solution containing water-soluble salts with respect to each of elements constituting the catalyst particles so as to precipitate hydroxides and the first calcination of the precipitates in a temperature range of 673K to 873K and the second calcination of the precipitates in a temperature range of 1223K to 1573K. In the reforming catalyst described in Patent Document 2, a porous molded material (a catalyst carrier) is impregnated with an aqueous solution containing catalytically active components such as Ni, Co and the like and carrier-constituting components such as Mg, Al, Zr, Ti, Ca and the like to infiltrate the catalytically active component and the carrier-constituting components into the porous molded material. Then, the porous molded material is dried, calcined at a high temperature of at least 700° C. and then activated at 500° C. or higher, thereby to disperse fine particulate catalyst particles on a surface layer of the porous molded material. It is disclosed that the high dispersion of the catalyst particles inhibits the deposition of carbonaceous matters onto the catalyst surface and thus excellent catalytic activities are maintained over a long period.

PATENT DOCUMENT 1: Japanese Unexamined Patent Application, First Publication No. 2002-126528.
PATENT DOCUMENT 2: Japanese Unexamined Patent Application, First Publication No. 2004-141860.

DISCLOSURE OF THE INVENTION

Problems to be Solved by the Invention

However, although the reforming catalysts disclosed in Patent Documents 1 & 2 inhibit deteriorative effects caused by the deposition of carbonaceous matters, by means of the high dispersion of catalytically active components, the catalytically active components are oxidized by excess steam or carbon dioxide for prolonged use, which results in decreased performance properties such as catalytic activity.

As a method for avoiding the decrease in performance properties due to the oxidation of the catalytically active components, an increase in an amount of the supported catalytically active components can be considered, however, when a large amount of the catalytically active components is present on the surface of the catalyst, the dispersion properties cannot be maintained, and consequently, a large deposition of carbonaceous matters cannot be avoided.

The present invention has been made to solve such problems, and it is an object of the present invention to provide a hydrocarbon-reforming catalyst maintaining a high catalytic activity over a long period and a process for producing a synthesis gas by using the catalyst.

Means for Solving the Problem

The mixture gas of carbon monoxide and hydrogen is reformed from a hydrocarbon raw material according to the following reaction formulas (1) to (4). On the other hand, carbonaceous matters are deposited on the surface of a catalyst according to the following reaction formulas (5) to (8). The carbonaceous matters deposited according to the following reaction formulas (5) to (8) are accumulated at boundaries between catalytically active components and a catalyst carrier so as to deactivate and damage the catalyst in the end. Even in the case where the catalytic activity is not decreased, accumulation of the carbonaceous matters causes deviation of gases passing through a reaction zone, which tends to increase a proportion of the catalyst ineffective for the reforming reactions.

[Chemical Formula 1]

$$CH_4 + CO_2 \Leftrightarrow 2CO + 2H_2 \tag{1}$$

$$CH_4 + H_2O \Leftrightarrow CO + 3H_2 \tag{2}$$

$$C_nH_m + nH_2O \Leftrightarrow nCO + (n+/2)H_2 \tag{3}$$

$$CO_2 + H_2 \Leftrightarrow CO + H_2O \qquad (4)$$

$$2CO \Leftrightarrow C + CO_2 \qquad (5)$$

$$CH_4 \Leftrightarrow C + 2H_2 \qquad (6)$$

$$CO + H_2 \Leftrightarrow C + H_2O \qquad (7)$$

$$C_nH_m \Rightarrow nC + m/2 H_2 \qquad (8)$$

Accumulation of carbonaceous matters is prevented when catalytically active components supported on the carrier are made to be very fine particles. It is thought that an effect of the particle size of the catalytically active components on cancellation of accumulation of carbonaceous matters is due to the relative acceleration rate of reverse reactions compared with the carbonaceous matter generating depositing reactions of (5) to (8). As the particle diameter of the catalytically active components becomes smaller, that is, as the catalytically active components are highly dispersed, the accumulation of carbonaceous matters tends to be canceled. It has been found that an oxidation resistance-improving component such as gallium, chromium, tungsten and the like supported on the surface of the carrier can suppress an oxidation of the catalytically active components due to steam and carbon dioxide and the like can improve an oxidation resistance of the catalytically active components themselves, by which the present invention has been achieved.

A reforming catalyst according to the present invention comprises a composite oxide having a composition represented by the following formula (I) in which Co, Ni and M are dispersed in said composite oxide.

Said M is preferably at least one element selected from the group consisting of gallium, chromium and tungsten.

$$aM.bCo.cNi.dMg.eCa.fO \qquad (I)$$

wherein a, b, c, d, e, and f are molar fractions, a+b+c+d+e=1, $0.0001 < a \leq 0.20$, $0 < b \leq 0.20$, $0 \leq c \leq 0.20$, $0.001 < (b+c) \leq 0.20$, $0.60 \leq (d+e) \leq 0.9989$, $0 < d < 0.9989$, $0 < e < 0.9989$, f=the number necessary for an element to keep a charge equilibrium with oxygen. And M (also referred to as 'the oxidation resistance-improving component' below) is at least one element of Group 3B elements and Group 6A elements in the Periodic Table.

In a process for producing a synthesis gas according to the present invention, the synthesis gas is obtained from hydrocarbon and a reforming agent by using said reforming catalyst. It is preferred that a supply ratio of the hydrocarbon and the reforming agent is made to be the reforming agent/carbon ratio=0.3 to 100.

Advantageous Effects of the Invention

According to the present invention, it can be provided a hydrocarbon-reforming catalyst maintaining a high catalytic activity over a long period and a process for producing a synthesis gas by using the catalyst.

DESCRIPTION OF THE REFERENCE SYMBOLS

Figure 1:
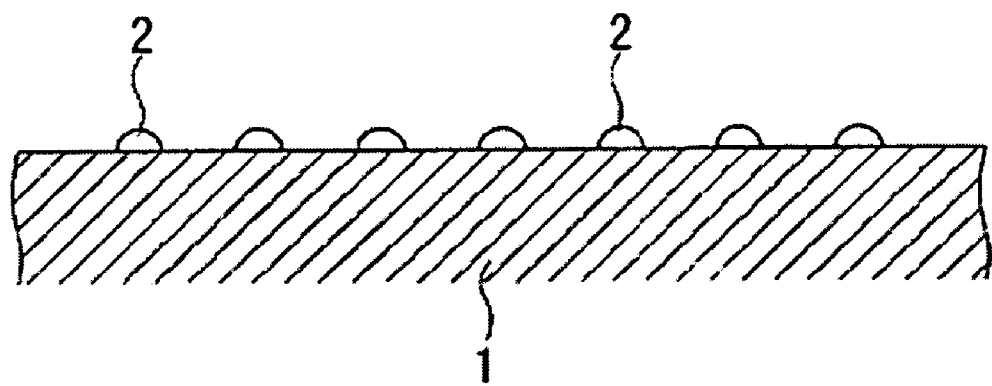
FIG. 1 is an explanatory figure schematically showing a surface state of the catalyst according to the present invention.

1: catalyst,
2: microparticle.

BEST MODE FOR CARRYING OUT THE INVENTION

The reforming catalyst according to the present invention comprises a composite oxide having a composition represented by the following formula (I) in which Co, Ni and M are dispersed in the composite oxide. The composition represented by the following formula (I) in the present invention is represented based on an anhydride after calcination.

$$aM.bCo.cNi.dMg.eCa.fO \qquad (I)$$

wherein a, b, c, d, e, and f are molar fractions, a+b+c+d+e=1, $0.0001 < a \leq 0.20$, $0 < b \leq 0.20$, $0 \leq c \leq 0.20$, $0.001 < (b+c) \leq 0.20$, $0.60 \leq (d+e) \leq 0.9989$, $0 < d < 0.9989$, $0 < e < 0.9989$, f=the number necessary for element to keep charge equilibrium with oxygen. And M (also referred to as 'the oxidation resistance-improving component' below) is at least one element of Group 3B elements and Group 6A elements in the Periodic Table.

The Periodic Table herein is one by the IUPAC.

In the above formula (I), M is at least one element of Group 3B elements and Group 6A elements in the Periodic Table. Among those, gallium is preferred as an element of Group 3B, and chromium and tungsten are preferred as an element of Group 6A.

In this composition, when the M content (a) is 0.0001 or lower, an effect on suppressing an oxidation is not manifested, and when the M content exceeds 0.20, the reforming activity is decreased, which is not proper. Accordingly, the M content (a) is $0.0001 < a \leq 0.20$, preferably $0.0001 < a \leq 0.15$, and more preferably $0.0001 < a \leq 0.10$.

The cobalt content (b) is $0 < b \leq 0.20$, and the nickel content (c) is $0 \leq c \leq 0.20$. When the total amount (b+c) of the cobalt content (b) and the nickel content (c) is 0.001 or lower, the contents of cobalt and/or nickel are too small and thus the reaction activity is low, and when it exceeds 0.20, the high dispersion described below is inhibited and thus an effect on inhibiting carbonaceous deposition cannot be sufficiently obtained. Accordingly, the total amount (b+c) of the cobalt content (b) and the nickel content (c) is $0.001 < (b+c) \leq 0.20$, preferably $0.001 < (b+c) \leq 0.15$, and more preferably $0.001 < (b+c) \leq 0.10$.

A total amount (d+e) of the magnesium content (d) and the calcium content (e) is $0.60 \leq (d+e) \leq 0.9989$, preferably $0.70 \leq (d+e) \leq 0.9989$, and more preferably $0.80 \leq (d+e) \leq 0.9989$. Among these, the magnesium content (d) is $0 < d < 0.9989$, preferably $0.20 \leq d < 0.9989$, and more preferably $0.50 \leq d < 0.9989$. The calcium content (e) is $0 < e < 0.9989$, preferably $0 < e \leq 0.5$, and more preferably $0 < e \leq 0.3$.

The total amount (d+e) of the magnesium content (d) and the calcium content (e) is determined as a balance with the M content (a), the cobalt content (b) and the nickel content (c). When the total amount (d+e) is within the range described above, an excellent effect is obtained in the reforming reaction at any ratio, however, when the calcium content (e) is large, the carbonaceous deposition can be suppressed but the catalytic activity is reduced as compared to the case where the magnesium content (d) is large. Therefore, if activity is important, the calcium content (e) of above 0.5 is not preferred since the activity is decreased.

"A composite oxide" as employed in the present invention is a kind of a solid solution where MgO and CaO have a rock salt type crystal structure and a portion of the Mg or Ca atoms positioned in the lattice is substituted with Co, Ni and M, which forms a monophase but is not a mixture of separate oxides of each element. In the present invention, the cobalt, nickel and M exist in a highly dispersed state in this composite oxide.

"Dispersion" as employed in the present invention is as usually defined in the field of catalysts, for example, as set forth in "Shokubai Koza, Vol. 5, Catalyst Design", p. 141 (Shokubai Gakkaihen, Kodanshakan), dispersion is defined as a ratio of the number of atoms exposed on the catalyst surface with respect to the total number of atoms of the supported metal.

To explain this specifically for the present invention using the explanatory FIGURE of FIG. 1, innumerable hemispherical, for example, microparticles 2 which form the center of activity are present on the surface of catalyst 1 comprising a composite oxide, and after the activation (reduction) treatment described below, these microparticles 2 comprise the cobalt, nickel and M metal elements, or compounds thereof. The dispersion ratio is designated as B/A, where A is the number of atoms of the cobalt, nickel and M metal elements or the compounds thereof comprised in the microparticles 2, and B is the number of atoms exposed on the surface of the microparticles 2 among those atoms.

Considering that the atoms exposed on the surface of the microparticles 2 participate in the catalyst reaction, it is thought that there are many atoms distributed on the surface of a catalyst in which the dispersion ratio is near 1 and thus the active centers are increased in the catalyst, resulting in high activity. In addition, if the particle diameter of the microparticles 2 becomes small without limitation, the majority of the atoms in the microparticles 2 will be exposed on the surface of the microparticles 2 with the dispersion ratio approaching 1. Accordingly, the diameter of microparticles 2 may be an index expressing the dispersion ratio.

In the catalyst according to the present invention, the diameter of microparticles 2 is less than 3.5 nm which is the limit of measurement for various measurement methods, for example, such as an X-ray diffraction method. For this reason, the catalyst according to the present invention may be deemed to have a high dispersion ratio in a highly dispersed state. Accordingly, the number of cobalt, nickel and M atoms participating in the reaction increases to result in high activity, and thus the reaction progresses stoichiometrically so as to prevent the carbonaceous (carbon) deposition.

Next, a preparation method of the reforming catalyst according to the present invention will be described. The preparation method of the catalyst according to the present invention is carried out by a so-called impregnation method, in which the catalyst is prepared by being supported on a carrier. After the catalytically active components are supported on the carrier, an oxidation resistance-improving component is supported. The catalytically active components and the oxidation resistance-improving component are impregnated on the carrier, dried and then calcined at a high temperature so as to disperse microparticles of the catalytically active components, as composite oxides on the carrier surface.

As the catalyst carrier, a carrier obtained by molding and calcining at least one selected from magnesia or a composite compound of magnesia and calcia is used. Since the carrier has a structure where pores are open at its surface, a relatively large amount of the catalytically active components and the oxidation resistance-improving component can be supported. Although a supported amount of the catalytically active components increases with the pore volume (porosity), an increase of porosity means a decrease in strength of the carrier. Therefore, the porosity of the carrier is properly determined considering the necessary supported amount of the catalytically active components and the strength of the carrier. For example, the carrier is prepared by compression molding or extrusion molding of a mixture which the carrier powder is optionally blended with graphite as a lubricant, cement and binder effective for improving the strength of a molded body, or the like and the porosity can be adjusted to a necessary value by the density of the green compact, the addition of a foaming agent or the like.

An impregnating aqueous solution is independently prepared as an aqueous solution of catalytically active components in which the catalytically active components are dissolved in water and an aqueous solution of the oxidation resistance-improving component in which the oxidation resistance-improving component is dissolved in water. Specifically, an aqueous solution of the catalytically active components comprising Co and/or Ni in the ratio represented in the above formula (I) and an aqueous solution of the oxidation resistance-improving component comprising M are prepared.

The catalytically active component in the present invention is at least one selected from cobalt and nickel.

The oxidation resistance-improving component in the present invention is at least one selected from the elements represented by M in the above formula (I).

Both the catalytically active components and the oxidation resistance-improving component can be used individually as one kind of the components or in a combination or two or more of the components and blended as an organic acid salt such as acetate, formate or the like, or an inorganic acid salt such as nitrate, chloride or the like. A molar ratio of the oxidation resistance-improving components/the catalytically active components is preferably adjusted to 0.001 to 0.5.

In the impregnation treatment, the impregnation conditions such as the aqueous solution concentration, the temperature, the time and so on are determined to make the supported amount of the catalytically active components in the obtained reforming catalyst be 0.1 to 20 mole %. The reasons for this is that the catalytic activity is low if the supported amount of the catalytically active components is less than 0.1 mole % and that, on the other hand, if the supported amount is above 20 mole %, the high dispersion is inhibited and thus an effect on inhibiting the carbonaceous matters is not sufficiently manifested. The supported amount of the catalytically active components can be measured by an X-ray fluorescence analysis or an atomic absorption analysis.

It is preferable that the impregnating aqueous solution has a temperature of 0 to 80° C. When it is below 0° C., the impregnation of the catalytically active components and the oxidation resistance-improving component onto the carrier tends to be insufficient. Meanwhile, when exceeds 80° C., a portion of the carrier becomes hydroxides which causes problems such as a decrease in the strength of the carrier or the like.

The impregnation time is preferably 10 to 60 minutes. When the impregnation time is less than 10 minutes, the impregnation of the catalytically active component and the oxidation resistance-improving component onto the carrier tends to be insufficient. Meanwhile, if the impregnation time exceeds 60 minutes, hydroxides of oxides comprised in the catalyst carrier tend to be formed in a large amount.

The catalyst precursor after the impregnation treatment is heated and dried to remove water to obtain the dried catalyst precursor. The drying temperature is not particularly limited, but, since the evaporation of water is accelerated as the temperature increases, a drying temperature is preferably kept at 100° C. or higher so as to complete the drying in a short time. The catalyst precursor is sufficiently dried, and thus a part of crystal water is also removed so that a volume change of the catalyst precursor will become less in the following calcination process. Insufficient drying causes bumping of residual water and volumetric shrinkage of the catalyst precursor in the calcination process, resulting in damage to the catalyst precursor. The complete removal of water can be determined by a weight loss of the catalyst precursor between before and after the drying.

The catalyst precursor after drying is calcined in an oxidative environment such as in the atmosphere. A calcining temperature is not particularly limited, but is preferably 700 to 1300° C. When it is below 700° C., an oxidation of the catalytically active component and the oxidation resistance-improving component tends to be insufficient, and when it exceeds 1300° C., the surface area of the catalyst becomes small which causes a decrease of the catalytic activity.

In addition, a calcining period is preferably 1 to 20 hours. When it is less than 1 hour, an oxidation of the catalytically active component and the oxidation resistance-improving component tends to be insufficient, and when it exceeds 20 hours, the catalytic activity tends to be decreased.

The reforming catalyst according to the present invention is prepared from the catalytically active components and the oxidation resistance-improving component which are migrated from the impregnating aqueous solutions onto the carrier so as to be homogeneously dispersed on the surface layer of the carrier. Since the catalyst particles are homogeneously dispersed on the surface layer of the carrier, a proportion of the catalyst particles effective for the catalytic reaction is significantly high and consequently the amount of the used catalyst can be reduced.

A process for producing a synthesis gas by using the reforming catalyst according to the present invention will be described.

Firstly, a treatment to activate the reforming catalyst is performed. This activating treatment is performed by heating the catalyst at a temperature range of 500 to 1,000° C., preferably 600 to 1,000° C., and more preferably 650 to 1,000° C. in the presence of a reducing gas such as hydrogen gas and the like for 0.5 to 50 hours. The reducing gas may be diluted with an inert gas such as nitrogen gas and so on. This activating treatment can be performed in the reactor where the reforming reaction is carried out.

By this activating treatment, the microparticles 2 on the surface of the catalyst 1 in FIG. 1 are reduced into a metallic element of Co, Ni or M or a compound thereof to manifest the catalytic activity. The activating treatment in the present invention is performed at a higher temperature in comparison with the activation of conventional Co or Ni oxide-type catalysts in the art. Since the activation of the conventional Co or Ni oxide-type catalysts in the art has been generally performed below 500° C., the activating treatment at a higher temperature in the present invention may contribute to the high dispersion as described above.

Next, a raw gas containing hydrocarbon and a reforming agent is supplied to a reactor tube charged with the reforming catalyst subjected to the activating treatment and the reaction is performed at arbitrary condition. Specifically, a temperature condition is 500 to 1,000° C., preferably 600 to 1,000° C., and more preferably 650 to 1,000° C. When it is lower than 500° C., the conversion rate of the hydrocarbon is low, which is not practical, and when it exceeds 1,000° C., a reactor tube having a high-temperature resistance is separately needed to cause an economical problem. A pressure condition (as a gauge pressure, same applies below) for performing the reaction is in the range of 0.1 to 10 MPa, preferably 0.1 to 5 MPa, and more preferably 0.1 to 3 MPa. The reasons for this is that when it is less than 0.1 MPa, the reactor tube becomes large and thus an investment or the like increases, and that when it exceeds 10 MPa, a reactor tube having a high-pressure resistance is needed.

The space velocity of the raw gas (GHSV: the value obtained when the supply rate of the raw gas is divided by the quantity of catalyst calculated as a volume) is in a range of 500 to 200,000 $h^{-1}$, preferably 1,000 to 100,000 $h^{-1}$, and more preferably 1,000 to 75,000 $h^{-1}$. In addition, a type of the catalyst bed can be optionally selected from conventionally known types such as a fixed bed, a moving bed, a fluidized bed and so on.

As hydrocarbon being a raw material for a synthesis gas, any hydrocarbon obtained from natural gas, petroleum gas, naphtha, heavy oil, crude oil, coal, coal sand and so on can be used, and as long as it contains hydrocarbon such as methane, it is not particularly limited. Two or more hydrocarbons may be mixed together.

As the reforming agent, water (steam), carbon dioxide, oxygen, air and so on can be used, and two or more kinds thereof may be mixed together. A preferred reforming agent is water or carbon dioxide, or a mixture of water and carbon dioxide.

A supply ratio of the hydrocarbon and reforming agent in the reaction is expressed as a molar ratio in which the number of carbon atoms in the hydrocarbon is set as the standard to be the reforming agent/carbon ratio=0.3 to 100, preferably 0.3 to 10, and more preferably 0.5 to 3. When the reforming agent/carbon ratio is less than 0.3, the carbonaceous deposition becomes significant, and when it exceeds 100, the reactor tube becomes large to increase an investment or the like.

An inert gas such as nitrogen or the like may be mixed together with a mixture gas of the hydrocarbon and reforming agent, as a diluent.

The reforming catalyst according to the present invention has a high activity since CoO, NiO or $MO_x$ is made into the composite oxide with MgO or MgO/CaO to disperse the cobalt, nickel and M. In addition, it is possible to suppress the carbonaceous (carbon) deposition even when the stoichiometric equivalent or an amount close thereto of hydrocarbon such as methane and the reforming agent such as steam are reacted, thereby efficiently producing a synthesis gas. As a result, it is not necessary to supply a large excess of the reforming agent such as steam and the reforming agent is not wasted, and thus the synthesis gas can be produced at a low cost. Further, since the catalyst is not contaminated with carbonaceous matters, deterioration in catalytic activity over time can be prevented, thereby extending the life of the catalyst. Moreover, deterioration in catalytic properties due to an oxidation is inhibited and thus the catalytic activity can be maintained in a high value over a long period.

EXAMPLES

Hereinafter, the present invention will be described with reference to Examples, but the invention is not limited thereto.

Example 1

A carrier was prepared by molding magnesia powder containing 0.1 mass % calcium in a cylindrical shape of 3 mm in outer diameter and 3 mm in height and calcining it at 1,100° C. As an impregnating solution, $Co(NO_3)_2.6H_2O$: 397.32 g was dissolved in water to prepare a 1 L aqueous solution of the catalytically active component. In addition, $Cr(NO_3)_2.9H_2O$: 184.54 g was dissolved in water to prepare a 1 L aqueous solution of the oxidation resistance-improving component. The carrier was soaked for 30 minutes in the aqueous solution of the catalytically active component maintained at room temperature and then the catalyst precursor pulled out from the aqueous solution was dried at 120° C. in air for 12 hours. The soaking and drying were repeated 3 times until the supported amount of Co (a catalytically active component) reached 5 mole %. After drying, the catalyst precursor was soaked in the aqueous solution of the oxidation resistance-improving component maintained at room temperature for 30 minutes and then dried at 120° C. for 12 hours. After drying, the catalyst precursor impregnated with the nitrate salts of Co and Cr was calcined at 1,250° C. for 5 hours in air to thereby obtain Catalyst A.

The obtained Catalyst A was used in performing Reaction Examples 1 to 3 described below. The results from Reaction Examples 1 to 3 are shown in TABLE 1.

Example 2

Catalyst B was obtained in the same manner as in Example 1, with the exception that $Co(NO_3)_2.6H_2O$ in EXAMPLE 1 was changed to 396.72 g and $Cr(NO_3)_2.9H_2O$: 184.54 g in EXAMPLE 1 was changed to $Ga(NO_3)_2.nH_2O$: 137.69 g. The obtained Catalyst B was used in performing Reaction Examples 1 to 3 described below. The results from Reaction Examples 1 to 3 are shown in TABLE 1.

Example 3

Catalyst C was obtained in the same manner as in Example 1, with the exception that $Co(NO_3)_2.6H_2O$ in EXAMPLE 1 was changed to be 395.63 g and $Cr(NO_3)_2.9H_2O$: 184.54 g in EXAMPLE 1 was changed to $(NH_4)_{10}W_{12}O_{41}.5H_2O$: 34.13 g. The obtained Catalyst C was used in performing Reaction Examples 1 to 3 described below. The results from Reaction Examples 1 to 3 are shown in TABLE 1.

Example 4

Catalyst D was obtained in the same manner as in Example 1, with the exception that $Co(NO_3)_2.6H_2O$: 397.32 g in EXAMPLE 1 was changed to $Co(NO_3)_2.6H_2O$: 297.99 g and $Ni(NO_3)_2.6H_2O$: 99.25 g. The obtained Catalyst D was used in performing Reaction Examples 1 to 3 described below. The results from Reaction Examples 1 to 3 are shown in TABLE 1.

Example 5

Catalyst E was obtained in the same manner as in Example 2 except that $Co(NO_3)_2.6H_2O$: 396.72 g in EXAMPLE 2 was changed to $Co(NO_3)_2.6H_2O$: 297.54 g and $Ni(NO_3)_2.6H_2O$: 99.10 g. The obtained Catalyst E was used in performing Reaction Examples 1 to 3 described below. The results from Reaction Examples 1 to 3 are shown in TABLE 1.

Example 6

Catalyst F was obtained in the same manner as in Example 3, with the exception that $Co(NO_3)_2.6H_2O$: 395.63 g in EXAMPLE 3 was changed to $Co(NO_3)_2.6H_2O$: 296.72 g and $Ni(NO_3)_2.6H_2O$: 98.83 g. The obtained Catalyst F was used in performing Reaction Examples 1 to 3 described below. The results from Reaction Examples 1 to 3 are shown in TABLE 1.

Comparative Example 1

Catalyst G was obtained in the same manner as in Example 1, with the exception of excluding $Cr(NO_3)_2.9H_2O$: 184.54 g in Example 1. The obtained Catalyst G was used in performing Reaction Examples 1 to 3 described below. The results from Reaction Examples 1 to 3 are shown in TABLE 1.

Comparative Example 2

Catalyst H was obtained in the same manner as in Comparative Example 1 except that $Co(NO_3)_2.6H_2O$: 397.32 g in Comparative Example 1 was changed to $Ni(NO_3)_2.6H_2O$: 397.00 g. The obtained Catalyst H was used in performing Reaction Examples 1 to 3 described below. The results from Reaction Examples 1 to 3 are shown in TABLE 1.

Comparative Example 3

Catalyst I was obtained in the same manner as in Comparative Example 1 except that $Co(NO_3)_2.6H_2O$: 397.32 g in Comparative Example 1 was changed to $Co(NO_3)_2.6H_2O$: 297.99 g and $Ni(NO_3)_2.6H_2O$: 99.25 g. The obtained Catalyst I was used in performing Reaction Examples 1 to 3 described below. The results from Reaction Examples 1 to 3 are shown in TABLE 1.

Reaction Example 1

20 mL of each of Catalysts A to I was charged in a flow-type reactor tube of inner diameter 16 mm and the activating treatment of the catalyst was performed by heating and maintaining the catalyst bed at 850° C. or higher with flowing hydrogen gas.

Subsequently, maintaining an outlet temperature of the catalyst bed at 850° C. and the reaction pressure at 2.0 MPa, methane/carbon dioxide/steam as a reaction gas in a ratio of 2/1/2 was supplied into the flow-type reactor tube at a condition of a gas hourly space velocity (GHSV): 3,000 $h^{-1}$. The methane conversion rate and an amount of carbons deposited on the catalyst at 20 hours after the start of the reaction are shown in TABLE 1.

Reaction Example 2

Omitting carbon dioxide in the reaction gas in Reaction Example 1, methane/steam was supplied in a ratio of 2/3 into the flow-type reactor tube at a condition of GHSV: 3,000 $h^{-1}$. A methane conversion rate at 20 hours after the start of the reaction is shown in TABLE 1.

Reaction Example 3

Omitting carbon dioxide from the reaction gas in Reaction Example 1, methane/steam was supplied in a ratio of 2/3 into the flow-type reactor tube at an outlet temperature of the catalyst bed: 580° C. and GHSV: 72000 $h^{-1}$. The methane conversion rate at 5 hours after the start of the reaction is shown in TABLE 1.

(Methane Conversion Rate)

The methane concentration in the reaction gas (the methane concentration in the raw gas) and the methane concentration at the outlet of the catalyst bed (the methane concentration after the reaction) were measured by a gas chromatography to obtain the methane conversion rate according to the following formula (II).

[Mathematical Formula 1]

Methane conversion rate (%)=[{(the methane concentration in the raw gas×the flow rate of the raw gas at the inlet of the catalyst bed)−(the methane concentration in the gas after the reaction×the flow rate of the gas at the outlet of the catalyst bed)}/{(the methane concentration in the raw gas×the flow rate of the raw gas at the inlet of the catalyst bed)}]×100. (II)

(Amount of Deposited Carbons)

After finishing the reaction in Reaction Example 1, the catalyst was taken from the reactor tube and the amount of carbons deposited on the catalyst surface was measured by a thermogravimetric analysis and a temperature programmed oxidation analysis.

TABLE 1

| No. | Reaction Examples Reaction gas GHSV (h⁻¹) | | | Reaction Example 1 methane/carbon dioxide/steam =2/1/2 3,000 | | Reaction Example 2 methane/ steam = 2/3 3,000 | Reaction Example 3 methane/ steam = 2/3 72,000 |
|---|---|---|---|---|---|---|---|
| Examples and Comparative Examples | Co | Ni | Oxidation resistance-improving component | Methane conversion rate (%) | Amount of deposited carbons (mass %) | Methane conversion rate (%) | Methane conversion rate (%) |
| Example 1 | O | X | Cr | 61 | 7 | 63 | 5 |
| Example 2 | O | X | Ga | 61 | 6 | 63 | 6 |
| Example 3 | O | X | W | 61 | 6 | 63 | 5 |
| Example 4 | O | O | Cr | 61 | 5 | 63 | 11 |
| Example 5 | O | O | Ga | 61 | 6 | 63 | 14 |
| Example 6 | O | O | W | 61 | 6 | 63 | 10 |
| Comparative Example 1 | O | X | X | 61 | 5 | 5** | 0*** |
| Comparative Example 2 | X | O | X | 0* | (45) | 63 | 13 |
| Comparative Example 3 | O | O | X | 61 | 8 | 63 | 0 |

*The reaction was ceased due to the blocking of the catalyst bed at 5 hours after the reaction started,
**The methane conversion rate at 5 hours after the reaction started,
***The catalyst was deactivated at 1 hour after the reaction started.

TABLE 1 contains the results from Reaction Examples 1 to 3 of Examples 1 to 6 and Comparative Examples 1 to 3. Examples 1 to 6 maintained high methane conversion rates even after 20 hours in any of Reaction Examples 1 and 2. In addition, it was found that the amount of deposited carbons was suppressed in Reaction Example 1. Meanwhile, Comparative Example 1 showed a significant decrease in the methane conversion rate after 20 hours in Reaction Example 2. In Reaction Example 1 of Comparative Example 2, the reaction was terminated 5 hours after the reaction started since the catalyst bed was blocked. At this moment, the amount of deposited carbons was 45 mass % and larger amount of deposited carbons was expected in a reaction for over 5 hours.

In the results from Reaction Example 3, deactivation or blocking of the catalyst was not shown in Examples 1 to 6 even with significantly increasing the space velocity of the raw gas. Compared to this, the catalyst in Comparative Example 1 was deactivated at 1 hour after the reaction was started and the methane conversion rate in Comparative Example 3 was significantly decreased at 5 hours after the reaction was started.

INDUSTRIAL APPLICABILITY

The present invention relates to a reforming catalyst, which comprises a composite oxide having a composition represented by the following formula (I) in which Co, Ni and M are dispersed in the composite oxide:

$$aM.bCo.cNi.dMg.eCa.fO \quad (I)$$

wherein a, b, c, d, e and f are molar fractions, a+b+c+d+e=1, 0.0001<a≦0.20, 0<b≦0.20, 0≦c≦0.20, 0.001<(b+c)≦0.20, 0.60≦(d+e)≦0.9989, 0<d<0.9989, 0<e<0.9989, f=the number necessary for element to keep charge equilibrium with oxygen. And M is at least one element of 3B Group elements and 6A Group elements in the Periodic Table.

According to the present invention, the catalytic activity can be maintained in a high value over a long period.

The invention claimed is:

1. A reforming catalyst, comprising a composite oxide having a composition represented by the following formula (I) in which Co, Ni and M are dispersed in said composite oxide:

$$aM.bCo.cNi.dMg.eCa.fO \quad (I)$$

wherein a, b, c, d, e, and f are molar fractions, a+b+c+d+e=1, 0.0001<a≦0.20, 0<b≦0.20, 0<c≦0.20, 0.001<(b+c)≦0.20, 0.60≦(d+e)≦0.9989, 0<d<0.9989, 0<e<0.9989, f=the number necessary for element to keep charge equilibrium with oxygen, and M is at least one element selected from the group consisting of Group 3B elements and Group 6A elements in the Periodic Table.

2. The reforming catalyst according to claim 1, wherein M is at least one selected from the group consisting of gallium, chromium and tungsten.

3. A process for producing a synthesis gas, wherein the synthesis gas is obtained from hydrocarbon and a reforming agent by using the reforming catalyst according to claim 2.

4. The process for producing a synthesis gas according to claim 3, wherein a supply ratio of the hydrocarbon and the reforming agent is the reforming agent/carbon ratio=0.3 to 100.

5. A process for producing a synthesis gas, wherein the synthesis gas is obtained from hydrocarbon and a reforming agent by using the reforming catalyst according to claim 1.

6. The process for producing a synthesis gas according to claim 5, wherein a supply ratio of the hydrocarbon and the reforming agent is the reforming agent/carbon ratio=0.3 to 100.

* * * * *